US010382619B2

(12) United States Patent
Rhyne

(10) Patent No.: US 10,382,619 B2
(45) Date of Patent: *Aug. 13, 2019

(54) SYSTEM, DEVICE, AND METHOD FOR TRACKING AND MONITORING MOBILE PHONE USAGE TO DETER AND PREVENT SUCH USAGE AND FOR GENERATING AN AUDIBLE ALARM AND/OR VISUAL ALARM TO MAINTAIN COMPLIANCE

(71) Applicant: Stephen Rhyne, Charlotte, NC (US)

(72) Inventor: Stephen Rhyne, Charlotte, NC (US)

(73) Assignee: Stephen Rhyne, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/997,147

(22) Filed: Jun. 4, 2018

(65) Prior Publication Data
US 2018/0288217 A1 Oct. 4, 2018

Related U.S. Application Data

(63) Continuation of application No. 15/455,995, filed on Mar. 10, 2017, now Pat. No. 10,009,455, which is a
(Continued)

(51) Int. Cl.
*H04W 4/48* (2018.01)
*H04M 1/725* (2006.01)
(Continued)

(52) U.S. Cl.
CPC .......... *H04M 1/72577* (2013.01); *G08B 3/10* (2013.01); *H04L 67/306* (2013.01);
(Continued)

(58) Field of Classification Search
CPC ................................................ H04W 4/38–48
See application file for complete search history.

(56) References Cited

U.S. PATENT DOCUMENTS 6,138,041 A 10/2000 Yahia
6,690,940 B1 2/2004 Brown et al.
(Continued)

FOREIGN PATENT DOCUMENTS

CN 101507250 A 8/2009
JP 2000-349895 A 12/2000
WO WO 2015/198306 A1 12/2015

OTHER PUBLICATIONS

Coxworth, Ben, cellCONTROL keeps mobile phones from working in moving cars, Web Article, Jan. 23, 2012, http://gizmag.com/scosche-cellcontrol-disables-mobile-phones/21192/.
(Continued)

*Primary Examiner* — San Htun
(74) *Attorney, Agent, or Firm* — K&L Gates LLP

(57) ABSTRACT

A system, device, and method for tracking and monitoring mobile phone usage to deter and prevent such usage and for generating an audible alarm and/or visual alarm to maintain compliance are disclosed. The system comprises a device and software on a user's mobile phone to monitor the mobile phone's usage and to prevent and/or interfere with certain of its functions while a vehicle is being operated. The device is capable of producing an audible alarm and/or visual alarm and recording information about the different states of the device, which can be transmitted to the mobile phone software. The device, in combination with the mobile phone software, can record information about certain behaviors the user engages in on the mobile phone while operating a vehicle. The system, device, and method include generating an audible alarm and/or visual alarm when the user is not complying with certain prescribed protocols.

12 Claims, 10 Drawing Sheets

Related U.S. Application Data continuation-in-part of application No. 15/133,597, filed on Apr. 20, 2016.

(51) Int. Cl.
*H04W 4/04* (2009.01)
*H04L 29/08* (2006.01)
*H04W 4/40* (2018.01)
*G08B 3/10* (2006.01)

(52) U.S. Cl.
CPC ... *H04M 1/72569* (2013.01); *H04M 1/72572* (2013.01); *H04W 4/046* (2013.01); *H04W 4/40* (2018.02); *H04L 67/125* (2013.01)

(56) References Cited

U.S. PATENT DOCUMENTS

| | | |
|---|---|---|
| 6,771,946 B1 | 8/2004 | Oyaski |
| 7,505,784 B2 | 3/2009 | Barbera |
| 7,555,378 B2 | 6/2009 | Larschan et al. |
| 7,697,917 B2 | 4/2010 | Camp, Jr. et al. |
| 7,876,205 B2 | 1/2011 | Catten et al. |
| 8,200,291 B2 | 6/2012 | Steinmetz et al. |
| 8,204,649 B2 | 6/2012 | Zhou et al. |
| 8,270,933 B2 | 9/2012 | Riemer et al. |
| 8,280,438 B2 | 10/2012 | Barbera |
| 8,461,973 B2 | 6/2013 | Reed et al. |
| 8,466,781 B2 | 6/2013 | Miller et al. |
| 8,502,642 B2 | 8/2013 | Vitito |
| 8,527,013 B2 | 9/2013 | Guba et al. |
| 8,626,121 B2 | 1/2014 | Poranen |
| 8,635,091 B2 | 1/2014 | Amigo et al. |
| 8,731,530 B1 | 5/2014 | Breed et al. |
| 8,750,797 B2 | 6/2014 | Ketari |
| 8,761,821 B2 | 6/2014 | Tibbitts et al. |
| 8,774,842 B2 | 7/2014 | Jones et al. |
| 8,787,868 B2 | 7/2014 | Leblanc et al. |
| 8,787,936 B2 | 7/2014 | Tibbitts et al. |
| 8,878,162 B2 | 10/2014 | Schrader et al. |
| 8,880,047 B2 | 11/2014 | Konicek et al. |
| 8,884,750 B2 | 11/2014 | Bacal |
| 8,952,800 B2 | 2/2015 | Bantz et al. |
| 8,971,927 B2 | 3/2015 | Zhou et al. |
| 8,994,492 B2 | 3/2015 | Farhan et al. |
| 9,094,533 B2 | 7/2015 | Geyer et al. |
| 9,129,460 B2 | 9/2015 | McClellan et al. |
| 9,185,526 B2 | 11/2015 | Guba et al. |
| 9,251,631 B2 | 2/2016 | Thompson et al. |
| 9,311,544 B2 | 4/2016 | Haley et al. |
| 9,386,447 B2 | 7/2016 | Tibbitts et al. |
| 9,587,958 B2 | 3/2017 | Campbell et al. |
| 10,009,455 B2 | 6/2018 | Rhyne |
| 2001/0050614 A1 | 12/2001 | Yang |
| 2003/0096593 A1 | 5/2003 | Naboulsi |
| 2005/0070245 A1 | 3/2005 | Nath et al. |
| 2005/0255874 A1 | 11/2005 | Stewart-Baxter et al. |
| 2006/0148490 A1 | 7/2006 | Bates et al. |
| 2006/0286930 A1 | 12/2006 | Rathus et al. |
| 2007/0072616 A1 | 3/2007 | Irani |
| 2007/0229234 A1 | 10/2007 | Smith |
| 2008/0255722 A1 | 10/2008 | McClellan et al. |
| 2009/0002147 A1 | 1/2009 | Bloebaum et al. |
| 2009/0221279 A1* | 9/2009 | Rutledge ........... H04M 1/72577 455/418 |
| 2010/0087137 A1 | 4/2010 | Fischer et al. |
| 2011/0021234 A1* | 1/2011 | Tibbitts ................. H04W 48/04 455/517 |
| 2012/0092148 A1 | 4/2012 | Santos |
| 2012/0214408 A1 | 8/2012 | Chronister |
| 2013/0157640 A1 | 6/2013 | Aycock |
| 2014/0302834 A1 | 10/2014 | Jones |
| 2017/0310804 A1 | 10/2017 | Rhyne |

OTHER PUBLICATIONS

FCC's Distracted Driving Information Clearinghouse, Distracted Driving Information Clearinghouse, Federal Government Website, Updated Dec. 7, 2015, Federal Communications Commission, United States.

Halverson, Nik, Device Disables Car to Prevent Driver from Texting, Web Article, http://mashable.com/2013/-3/15/device-disables-car-to-prevent-driver-from-texting/, Mar. 15, 2013, United States.

LaVallee, Andrew, Firms Racing to End Texting and Driving, Newspaper, Aug. 26, 2009, The Wall Street Journal, United States.

Lyden, Sean, 6 Mobile Applications to Prevent Distracted Driving Accidents, Magazine, Aug. 1, 2011, Automotive Fleet, United States.

Simons, Daniel and Christopher Chabris, A Simple Solution for Distracted Driving, Newspaper, Oct. 30, 2015, The Wall Street Journal, United States.

Swanson, Can Technology Prevent Teen Distracted Driving?, Website, Oct. 9, 2013, Updated Jan. 9, 2015, Edmunds.com, United States.

\* cited by examiner

FIGURE 4

| | User Profile: Selecting Features |
|---|---|
| While stopped | All phone functionality works below 2 mph |
| While moving | |
| Speed Check / Speed Threshold (e.g. 15 mph) | Admin or User determines if Full mobile phone functionality is allowed under the Speed Threshold. The mobile phone functionality will become disabled once hitting the Speed Threshold. Ability of User to initiate a Speed Check, which uses the mobile phone's GPS to determine if the mobile phone is at a speed below the Speed Threshold. If the User initiates a Speed Check, and the mobile phone's GPS determines the mobile phone is below the Speed Threshold, then the full functionality of the phone works until the mobile phone's GPS determines the phone is above the Speed Threshold, at which time there is once again reduced functionality of the mobile phone. Alternatively, speed may be determined using GPS technology that is available in the vehicle. |
| Mobile Phone Sensor Technology | Admin or User determines if Full mobile phone functionality is allowed when the mobile phone is Not In Motion through using the mobile phone's sensor technology. Alternatively, motion may be determined using accelerometer technology that is available in the vehicle. The mobile phone functionality will become disabled once the mobile phone is In Motion. |
| Texting | Admin or User determines if texting is Allowed or Not Allowed when under Speed Threshold/Not In Motion. No texting usage after hitting Speed Threshold/when in Motion. Admin or User can enable automatic response text back that driving. |
| Telephone Usage | Admin or User determines if telephone usage is allowed. Admin or user can enable automatic-response via phone message that driving. |
| Email | Admin or User determines if emailing is Allowed or Not Allowed when under Speed Threshold/Not In Motion. No emailing usage after hitting Speed Threshold/when in Motion. Admin or User can enable automatic-response email back that driving. |
| Apps | Admin or User determines which applications can run in background. |

FIGURE 5

View of User for a Week

Limited Use—With Telephone
Monitor
David - User
Steve - Admin

| Date | Completed Apps / Mins | Alarm / Mins | Telephone Call / Mins | Text / Mins | Email / Mins | Prohibited Apps / Mins | Other Infractions / Mins | App Count |
|---|---|---|---|---|---|---|---|---|
| Last 7 Days | 54 / 417 | 4 / 15 | 5 / 47 | 2 | 3 / 5 | 3 / 8 | 1 / 25 | 429 |
| Tuesday, March 31, 2015 | 3 / 60 | 1 / 5 | 1 / 8 | 1 | | 2 / 3 | | 24 |
| Monday, March 30, 2015 | 6 / 45 | | 2 / 22 | | 3 / 5 | | 1 / 25 | 39 |
| Sunday, March 29, 2015 | 8 / 43 | | | | | | | 100 |
| Saturday, March 28, 2015 | 8 / 87 | 2 / 7 | 1 / 14 | | | | | 31 |
| Friday, March 27, 2015 | 5 / 23 | | | 1 | | | | 75 |
| Thursday, March 26, 2015 | 14 / 94 | | 1 / 3 | | | 1 / 5 | | 86 |
| Wednesday, March 25, 2015 | 10 / 65 | 1 / 3 | | | | | | 75 |

FIGURE 6

View of User for a Day

Limited Use—With Telephone

Monitor

David - User

Steve - Admin

| Date | Connected/Allowed Mins | Alarms/Mins | Telephone Calls/Mins | Texts | Email/Mins | Prohibited Apps/Mins | Other Infractions/Mins | App Sent |
|---|---|---|---|---|---|---|---|---|
| Tuesday, March 31, 2015 | 3/60 | 1/5 | 1/8 | 1 | 0/0 | 2/3 | 0/0 | 24 |
| 3:45 PM | 1/30 | | 1/8 | | | | | |
| 1:00 PM | 1/20 | 1/5 | | | | | | |
| 11:15 AM | 1/10 | | | 1 | | 2/3 | | |

FIGURE 7

View of all Users in the Group

| Last 7 Days | Connected / Mins | Absent / Mins | Telephone Calls / Mins | Text | Email / Mins | Prohibited Apps / Mins | Other Infractions / #s | App Score |
|---|---|---|---|---|---|---|---|---|
| | | | | | Group.Family—Rhyne | | | |
| Steve | 66/541 | 2/7 | | | | | | 645 |
| David | 54/417 | 4/15 | 5/47 | 2 | 3/5 | 3/8 | 1/-25 | 429 |
| Stephen | 66/541 | | | | | | | 700 |
| Jane | 50/320 | | | | | | | 700 |

FIGURE 8

View of Device for a Week

Device = Steve's Car

| Date | On Min | Connected Min | SMS Sent | Alerts / Min Remaining On | Duty Cycle |
|---|---|---|---|---|---|
| Last 7 Days | 9,120 | 132 / 1082 | 3 / 960 | 4 / 14 | 90% | 578 |
| Tuesday, March 31, 2015 | 840 | 16 / 86 | 2 / 600 | 2 / 6 | 58% | 33 |
| Monday, March 30, 2015 | 1,440 | 12 / 90 | | | 100% | 100 |
| Sunday, March 29, 2015 | 1,440 | 20 / 244 | | | 100% | 100 |
| Saturday, March 28, 2015 | 1,080 | 16 / 174 | 1 / 360 | | 75% | 75 |
| Friday, March 27, 2015 | 1,440 | 16 / 130 | | 2 / 8 | 100% | 70 |
| Thursday, March 26, 2015 | 1,440 | 28 / 188 | | | 100% | 100 |
| Wednesday, March 25, 2015 | 1,440 | 24 / 170 | | | 100% | 100 |

FIGURE 10

SYSTEM, DEVICE, AND METHOD FOR TRACKING AND MONITORING MOBILE PHONE USAGE TO DETER AND PREVENT SUCH USAGE AND FOR GENERATING AN AUDIBLE ALARM AND/OR VISUAL ALARM TO MAINTAIN COMPLIANCE

FIELD OF THE INVENTION

The present invention relates generally to systems, devices, and methods for tracking and monitoring mobile phone usage to deter and prevent such usage, and more particularly to a device and method that operates to track and monitor the usage of a mobile phone in a vehicle, to generate an audible alarm and/or visual alarm to maintain compliance, and to monitor and/or interfere with certain functions of the mobile phone while the vehicle is being operated. The audible and/or visual alarm to maintain compliance is used to help prevent a user from potentially bypassing the system and device that are intended to help prevent distracted driving.

BACKGROUND OF THE INVENTION

Usage of mobile phones while driving is known to be a cause or a contributing factor in automobile crashes and fatalities. Numerous states and municipalities have enacted laws banning or restricting the use of mobile phones while driving. However, these laws are often ignored and driver mobile phone distraction continues to be a significant, and perhaps increasing, public safety concern.

As used herein, the term "mobile phone" includes any type of mobile device, communication device or other computing device usable by the driver of a vehicle, including but not limited to cellular phones, smart phones, tablets, laptop computers, electronic reading devices, multimedia equipment, and any comparable device that would or could be used by a driver while operating a vehicle.

As used herein, the term "vehicle" includes any type of vehicle or automobile that can be used to transport people or goods from one location to another location, including but not limited to cars, trucks, commercial trucks, recreational vehicles, buses, commercial heavy duty equipment (e.g., earth moving equipment), military vehicles, electric bicycles, motorcycles, ships, boats, jet skis, trains, trams, hot air balloons, helicopters, planes, and any comparable type of vehicle that presents a risk if the operator is distracted while operating the vehicle.

Employers whose employees' duties include driving have a strong interest in knowing that those employees are driving safely. This includes a desire to limit or prevent mobile phone use and to know whether the employees are in fact following all relevant regulations. Parents of young drivers have similar interests, wanting to know that their children are not using a mobile phone while driving and particularly are not texting. In addition, certain other individuals may be concerned about their own personal use of a mobile phone (or the mobile phone use of others) while operating a vehicle and want a device to help limit their use of the mobile phones while driving. Some groups, such as carpools, have interests in monitoring and knowing group members' level of mobile phone use while they are driving. Insurance carriers also have an interest in reducing or monitoring distracted driving as distracted driving is a contributor to many car crashes. Supporters of campaigns or pledges (such as a pledge at work not to engage in distracted driving) also have an interest in reducing distracted driving for those who have pledged not to engage in such activities. Groups of these types and others composed of employees, insured drivers, family members or friends, for example, could form to apply social or peer pressure to promote safe driving by limiting mobile phone usage while driving based on recorded data about mobile phone usage while driving.

There are existing technologies that have been proposed and developed to prevent drivers from using mobile phones while driving. These are in two general categories: (i) electronic or mechanical devices that are either installed into vehicle ports or mounted in the vehicle, or (ii) mobile phone applications that sense motion of the mobile phone.

Devices in the first category, electronic or mechanical devices, can be installed into various vehicle ports or mounted in the vehicle, and are commonly installed into the onboard diagnostic port. U.S. federal law mandates that every car manufactured after 1996 include an onboard diagnostic port ("OBD II"). The OBD II is the vehicle's on-board computer(s) and port that are monitoring all the subsystems of a vehicle, providing real-time data and diagnostic trouble codes (this is the same port used by technicians to obtain diagnostic trouble codes when the "check engine" light is on). The live data available from the OBD II can include numerous vehicle measurements and characteristics, such as vehicle speed (MPH), engine revolutions per minute (RPM), absolute throttle position, and accelerator pedal position. The OBD II relies on data from numerous sensors contained within the vehicle to monitor the vehicle. The OBD II allows compatible devices the ability to obtain this data from the vehicle when it is being driven or is parked, and this data can be extrapolated to determine various aspects of driving habits and behaviors. These devices are often used to detect the ongoing speed of the vehicle through constant monitoring, while the device described herein is monitoring to determine when the vehicle is turned on, when the vehicle is turned off, and when certain prescribed protocols are violated. There can be significant vehicle battery drain from using data from the OBD II, as the OBD II monitors many systems in a vehicle.

Existing technologies in the second category, mobile phone applications that sense motion of the phone, also suffer from several limitations. The sensing technologies rely on motion of the mobile phone to detect that the phone's user is driving; however, the mere fact that the mobile phone is moving at the rate of speed of a vehicle does not indicate that the user is driving. There can be significant mobile phone battery drain from using these mobile phone applications as these applications often rely on the mobile phone's GPS.

In the present invention, generating of an audible alarm and/or visual alarm to initiate and maintain compliance, as well as when certain prescribed protocols are violated, is similar to the seat belt reminder system ("SBRS") warning that is generated when a driver does not buckle his or her seat belt after a vehicle is turned on. The first driver seat belt warning systems and seat belt interlocks date back to the 1970s, when seat belt use was as low as 12 to 15 percent. In 1971, the National Highway Traffic Safety Administration sought to increase seat belt use by adopting occupant protection options for vehicles manufactured after 1972 that required the use of a SBRS for the front outboard seating positions. Ultimately, the legislation was amended to only require that the driver's seating position be equipped with a seat belt warning system that activates, under circumstances when the driver's seat belt is not buckled, a continuous or intermittent audible signal for a period of not less than 4 seconds and not more than 8 seconds, and a continuous or flashing warning light for not less than 60 seconds after the vehicle is started. This provision has remained a part of the standard for vehicles manufactured since 1974. Through various legislation, enforcement, community outreach, technology improvements, the public's acceptance of seat belts, and other measures, seat belt use in 2015 reached 88.5 percent.

Accordingly, there is a need for a method of tracking, monitoring and preventing mobile phone usage that does not significantly drain the vehicle's battery or the mobile phone's battery, is simple to use, and additionally uses an audible alarm and/or visual alarm when the vehicle turns on, as well as uses an audible alarm and/or visual alarm to maintain compliance when certain prescribed protocols are violated. The audible and/or visual alarm to maintain compliance is used to help prevent a user from potentially bypassing the system and device that are intended to help prevent distracted driving. In contrast to the existing OBD II monitoring devices and the mobile phone applications described, the present invention generates an audible alarm and/or visual alarm when certain prescribed protocols are violated, including when the vehicle is turned on, and can be located in the vehicle's dashboard or electronic system, such as the electronic system that is generally associated with the vehicle radio or music equipment, vehicle navigation equipment, vehicle heating and air conditioning system, or electronic controls as the access point for a vehicle monitoring device, which has several inherent advantages. First, generating an audible alarm and/or visual alarm when the vehicle turns on alerts the user to connect the device and the mobile phone software, similarly to the alert from the SBRS warning that is generated when a driver does not buckle his or her seat belt after the vehicle is turned on. Second, most vehicles currently manufactured come equipped with a dashboard or electronic system, and thus the present invention relates to equipment generally available in a large segment of vehicles. Third, the vehicle's dashboard or electronic system is a dedicated space within the vehicle often used for other alert signals regarding the vehicle. Fourth, the typical position of the vehicle's dashboard or electronic system allows the device to be placed in a space where signals, such as sound and light, can be readily heard or seen by the driver. Fifth, the present invention results in significantly less vehicle battery drain than an OBD II device. Sixth, the present invention results in significantly less mobile phone battery drain than mobile phone applications described. The inventions described herein addresses the above needs, as well as providing additional features and applications, as will become readily apparent to one of ordinary skill in the art.

SUMMARY OF THE INVENTION

The present invention relates generally to systems, devices, and methods for tracking and monitoring mobile phone usage while operating a vehicle in order to deter and prevent such usage and for generating an audible alarm and/or visual alarm to maintain compliance. The audible and/or visual alarm to maintain compliance is used to help prevent a user from potentially bypassing the system and device that are intended to help prevent distracted driving. The system, device, and method operate to monitor the usage of a mobile phone in a vehicle and to prevent and/or interfere with certain functions of the mobile phone while the vehicle is being operated. The device, which can be located in the vehicle's dashboard, the vehicle's electronic system, or attached to any electrical circuitry in the vehicle, is capable of producing an audible alarm and/or visual alarm, logging and storing information on the device about the number of times and minutes that the device is in different states, which information can be transmitted to the application or operating system on the mobile phone. The device, in combination with the mobile phone application or mobile phone operating system, is capable of logging and storing information on (i) the device and/or (ii) the mobile phone application or mobile phone operating system about certain behaviors the user engages in on the mobile phone while operating a vehicle. As used herein, "mobile phone software" means any software application on a mobile phone, any mobile phone operating system, or any other software, software process, or code on a mobile phone. The device may have a certain software component in order to properly function, as further described herein. The device is capable of generating an audible alarm and/or visual alarm when the user is not maintaining compliance with or is violating certain prescribed protocols, including:

i) not connecting the device and the mobile phone software when the vehicle is turned on;

ii) exiting the mobile phone software while driving;

iii) stopping the connection between the mobile phone software and the device while driving;

iv) putting the mobile phone software in the background of the mobile phone while driving; and/or v) engaging in certain prohibited mobile phone functions while driving.

In certain embodiments, the mobile phone software is capable of generating an audible alarm and/or visual alarm when the user is not maintaining compliance with or is violating certain prescribed protocols as listed above.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, which are not necessarily to scale, wherein:

FIG. 4 is an illustrative chart of potential features available to limit or prevent mobile phone functionality that an administrator or user can choose from in a user's profile. This chart is not meant to limit the design or provide an exhaustive list of functionality.

FIG. 5 is an illustrative chart of potential pre-defined profiles available to limit or prevent mobile phone functionality that an administrator or user can choose from in a user's profile. This chart is not intended to limit the design, pre-defined profiles available, or provide an exhaustive list of functionality.

FIG. 6 is a graphical illustration of a computer screen showing the user records of the mobile phone software as seen by an administrator or user for a 7 day or 1 week period, wherein the user's mobile phone software is configured to monitor mobile phone usage. The computer screen may be on different types of devices such as mobile phones, tablets, and personal computers.

FIG. 7 is a graphical illustration of a computer screen showing the user records of the mobile phone software as seen by an administrator or user for a 1 day period, wherein the user's mobile phone software is configured to monitor mobile phone usage. The computer screen may be on different types of devices such as mobile phones, tablets, and personal computers.

FIG. 8 is a graphical illustration of a computer screen showing the user records of the mobile phone software as seen by an administrator or user for a 7 day period for a group of users. The computer screen may be on different types of devices such as mobile phones, tablets, and personal computers.

FIG. 10 is a graphical illustration of a computer screen showing the device records for a certain vehicle as seen by an administrator or user for a 7 day or 1 week period. The computer screen may be on different types of devices such as mobile phones, tablets, and personal computers.

DETAILED DESCRIPTION OF THE INVENTION

Figure 1:
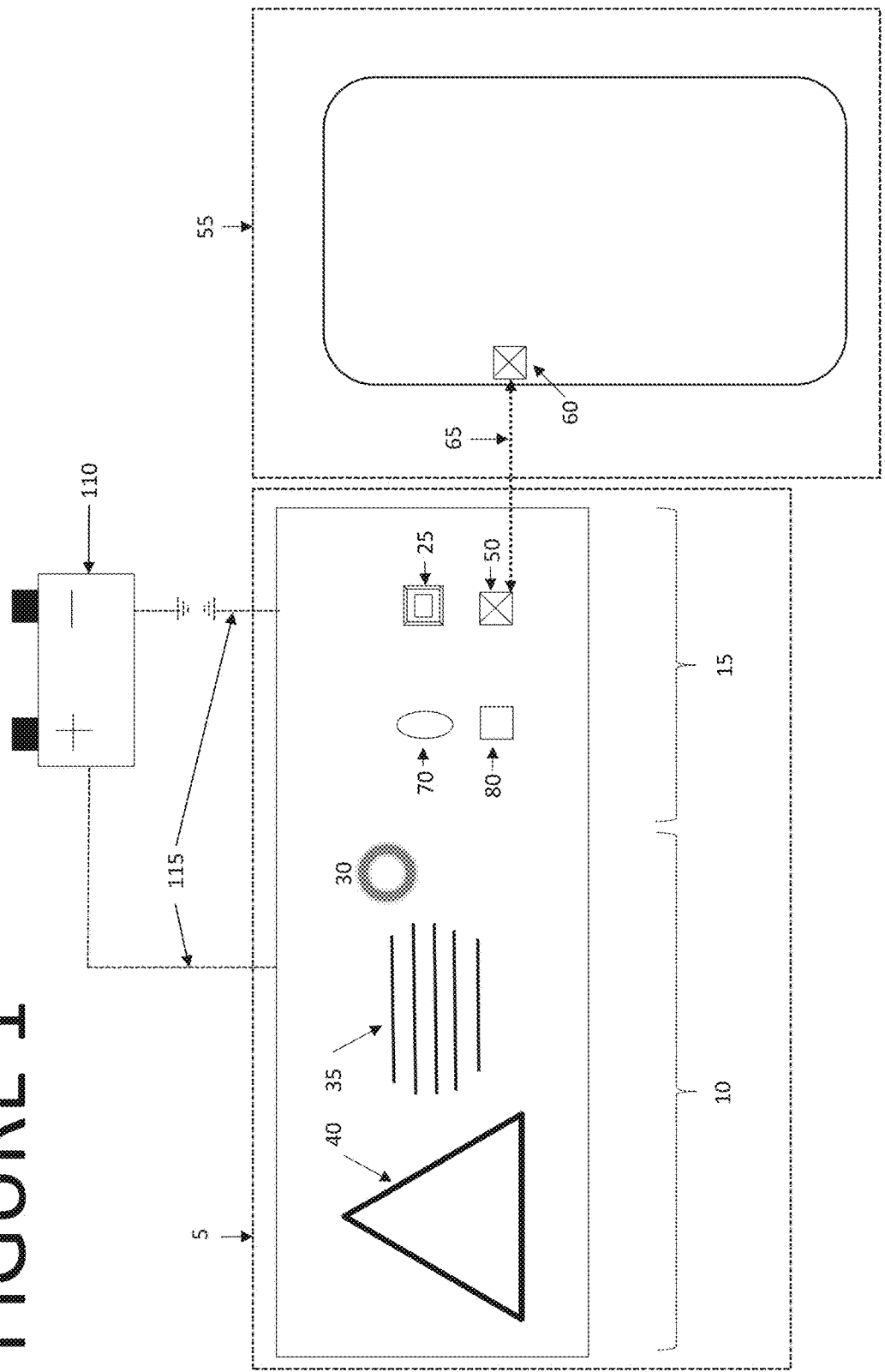
FIG. 1 is a perspective view of the overall system and the device of the present invention.

The following detailed description of the embodiments is merely exemplary in nature and is in no way intended to limit the invention, its application, or its uses.

In an aspect of the present invention, a system, device and method are provided for (i) tracking, monitoring, and preventing mobile phone usage while a user is operating a vehicle in order to deter and prevent such usage, and (ii) for generating an audible alarm and/or visual alarm to maintain compliance with certain prescribed protocols. The audible and/or visual alarm to maintain compliance is used to help prevent a user from potentially bypassing the system and device that are intended to help prevent distracted driving. The system, device and method operate to monitor the usage of a mobile phone in a vehicle and to prevent and/or interfere with certain functions of the mobile phone while the user is operating a vehicle. The device is configured to communicate with the mobile phone through a short range wireless communication protocol. Such a short range wireless communication protocol can be used to limit the amount of battery power needed for communication between the device and the mobile phone. The device is configured to determine the vehicle state, which includes when the vehicle turns on and when the vehicle turns off, by: (i) using a microchip to determine when the device starts receiving electricity from the vehicle's battery or stops receiving electricity from the vehicle's battery; and/or (ii) using one or more accelerometers to detect vibrations of vehicle components. In each of these methods, the component of the device that is used to determine the vehicle state, i.e., microchip and/or accelerometer, is a "vehicle state sensor". As used herein, the term "vehicle state sensor" refers to the foregoing or to any other component of the device that is capable of detecting a characteristic of the vehicle that may be used to determine the vehicle state.

As used herein, the term "short range wireless communication protocol" includes any type of short range wireless communication protocol that allows communication or the exchange of data or information between electronic devices, including but not limited to ANT+, Bluetooth, Bluetooth Low Energy, Cellular, IEEE 802.15.4, IEEE 802.22 (Wireless Regional Area Network), ISA 100a, Infrared (IrDA), ISM band, Near-field communications (NFC), Radio-frequency identification (RFID), 6LoWPAN, Ultra Wideband (UWB), Wi-Fi, Wireless Body Area Networks (WBAN), Wireless Personal Area Networks (WPAN), Wireless Hart, WirelessHD, WirelessUSB, ZibBee, Z-Wave, and any comparable communication protocol that would allow communication between two electronic devices in proximity of one another.

In another aspect of the invention, when the device and the mobile phone software are connected, a software application on the mobile phone or software on the mobile phone operating system is used to monitor, control, and/or prevent usage of certain features of the mobile phone while the user is driving. When the mobile phone software is connected with the device, the mobile phone may have reduced functionality, as may be determined by an administrator or user through the user's profile by selecting to disable certain available features or through a pre-defined user profile in the mobile phone software's settings, such as limiting or preventing all text messaging, limiting or preventing the use of email, limiting or preventing the use of certain applications, and limiting or preventing the use of telephone calls. When the mobile phone software is connected with the device, the mobile phone software will also monitor the mobile phone for such functionality as telephone calling, texting, emailing, using certain prohibited applications on the mobile phone, and/or other infractions, and will store such information on the mobile phone software and/or transmit the data to the device. Certain mobile phone operating systems may allow a user or administrator to monitor mobile phone usage and/or prevent mobile phone usage, while certain other mobile phone operating systems, however, may only allow a user or administrator to monitor mobile phone usage, but not to prevent mobile phone usage, due to the security settings of the mobile phone operating system. The present invention, in its various embodiments, is advantageously configured to operate within the restrictions of any type of mobile phone operating system.

Referring to the figures, FIG. 1 is an overall diagram of the system of the present invention. The device 5 is configured to be connected to any electrical circuitry in the vehicle (e.g., the wiring harness or secondary wires in a vehicle) that receives electricity directly or indirectly from the battery of the vehicle, including the vehicle's dashboard (e.g., the dashboard behind the steering wheel or the dashboard between the passenger and the driver) or the vehicle's electronic system (e.g., vehicle radio or music equipment, vehicle navigation equipment, vehicle heating and air conditioning system, or electronic controls). The device 5 includes a display region 10 and an internal region 15. The device 5 includes an integrated microchip 25 and a wireless transmitter/receiver 50 in the internal region 15. The device 5 includes a status indicator light 30, a speaker 35, and a visual alert 40 that are contained in the display region 10 so that a user can hear and/or observe the alarm. Various components of the device may utilize equipment already existing in a vehicle. Thus, the device can be a separate after-market system or integrated into any existing equipment in the vehicle. The status light indicator light 30 and the visual alert 40 may optionally be combined into one visual light display.

The device includes a microchip 25 that can measure if the device 5 is receiving electricity directly or indirectly from the battery of the vehicle, to determine when the vehicle is turned on and when the vehicle is turned off. As used herein, the term "microchip" includes any type of microchip, computer chip, group of electronic circuits that work together on a small piece of hard material (e.g., silicon), or processing unit including but not limited to a microchip, computer chip, processing unit, or any other similar instruments that can be used to determine if the microchip is receiving electricity directly or indirectly from the battery of the vehicle when the vehicle is turned on and when the vehicle is turned off. The device 5 may optionally further include a power source 70. The optional power source 70 may be any known type of portable power source, for example, a lithium ion battery. The device may optionally further include an accelerometer 80. As used herein, the term "accelerometer" includes any type of accelerometer, vibration sensor, or instrument that can be used to measure acceleration, vibration, or movement, including but not limited to an accelerometer, gyroscope, magnetometer, or any similar instruments.

Either the vehicle's battery 110 or the optional power source 70 functions to power various components of the device 5. Similarly, either the vehicle's battery 110 or the optional power source 70 is used to power the microchip 25. The microchip 25 may optionally be configured to store data related to the count and time of the device in each of various states, the count and time that the audible alarm and/or visual alarm is on, as well as telephone calling, texting, emailing, using certain prohibited applications on the mobile phone, and/or other infractions, as further described herein. The speaker 35 and the visual alert 40 function primarily when the vehicle turns on.

The integrated microchip 25 of the device 5 controls the functions of other components of the device 5, including the wireless transmitter/receiver 50, the status indicator light 30, the speaker 35, the visual alert 40, and the accelerometer 80. The integrated microchip 25 or other components of the device 5 can have embedded software capable of running processes to produce an audible alarm and/or visual alarm, log and store information on the device about the number of times and minutes that the device is in different states, and log when users connect mobile phones with the device. The wireless transmitter/receiver 50 communicates with a corresponding wireless receiver/transmitter 60 integrated within the mobile phone 55 of the user. As indicated above, as used herein, the term "mobile phone" includes any type of mobile device, communication device or other computing device usable by the user of a vehicle, including but not limited to cellular phones, smart phones, tablets, laptop computers, electronic reading devices, multimedia equipment, and any comparable device that would or could be used by a user while operating a vehicle. The wireless connection between the wireless transmitter/receiver 50 and the wireless receiver/transmitter 60 can be any short range wireless communication protocol 65.

In another aspect, the system of the invention for monitoring or preventing mobile phone use in a vehicle requires mobile phone software to be installed on the user's mobile phone 55. The mobile phone software provides the functionality needed to interpret the short range wireless communication protocol 65 signals from the device 5 and to control various functions of the mobile phone 55, as further detailed herein. The mobile phone software is capable of transmitting data via the mobile phone's wireless receiver/transmitter 60 to the device's wireless transmitter/receiver 50 about the user's telephone calling, texting, emailing, using certain prohibited applications on the mobile phone, and/or other infractions while the user was operating a vehicle. In certain embodiments, the user interface on the mobile phone software may be navigated without the user needing to look at the user interface, by using a simple menu and voice command functionality.

Once the mobile phone 55 is within the physical range for establishing a short range wireless communication protocol 65 connection to the device 5, the mobile phone software may manually or automatically connect to the device via the short range wireless communication protocol 65. This process may occur before the vehicle turns on, for example when the user is getting in the vehicle, or these steps can occur after the vehicle is on.

In one embodiment, through its connection with vehicle's electrical circuitry 115 to the vehicle battery 110, the device 5 uses any of the electrical circuitry in the vehicle (e.g., the wiring harness or secondary wires in a vehicle) to determine when the vehicle is turned on by receiving electricity from the vehicle's battery.

In a vehicle, the vehicle electrical circuitry is powered by the vehicle battery through a closed circuit. The majority of ancillary or subsidiary circuits are wired through the ignition switch. When the vehicle is turned on, then the electrical circuit is completed and electricity flows through the closed circuit. By completing the circuit, then electricity flows through the ancillary or subsidiary circuits to various components in the vehicle, including the vehicle's dashboard and the vehicle's electronic system. When the vehicle is turned on and the circuit is completed and closed, the microchip 25 begins receiving electricity from the vehicle's battery. When the vehicle is turned off, then the flow of electricity stops when the circuit is open and the microchip 25 stops receiving electricity from the vehicle's battery. After the vehicle turns on and has been running, the vehicle alternator provides power to the vehicle through the vehicle electrical circuitry and recharges the vehicle battery. The present invention includes use of the electricity from the vehicle alternator or any other vehicle component that is capable of producing electricity that flows through the electrical circuitry of the vehicle.

Figure 2:
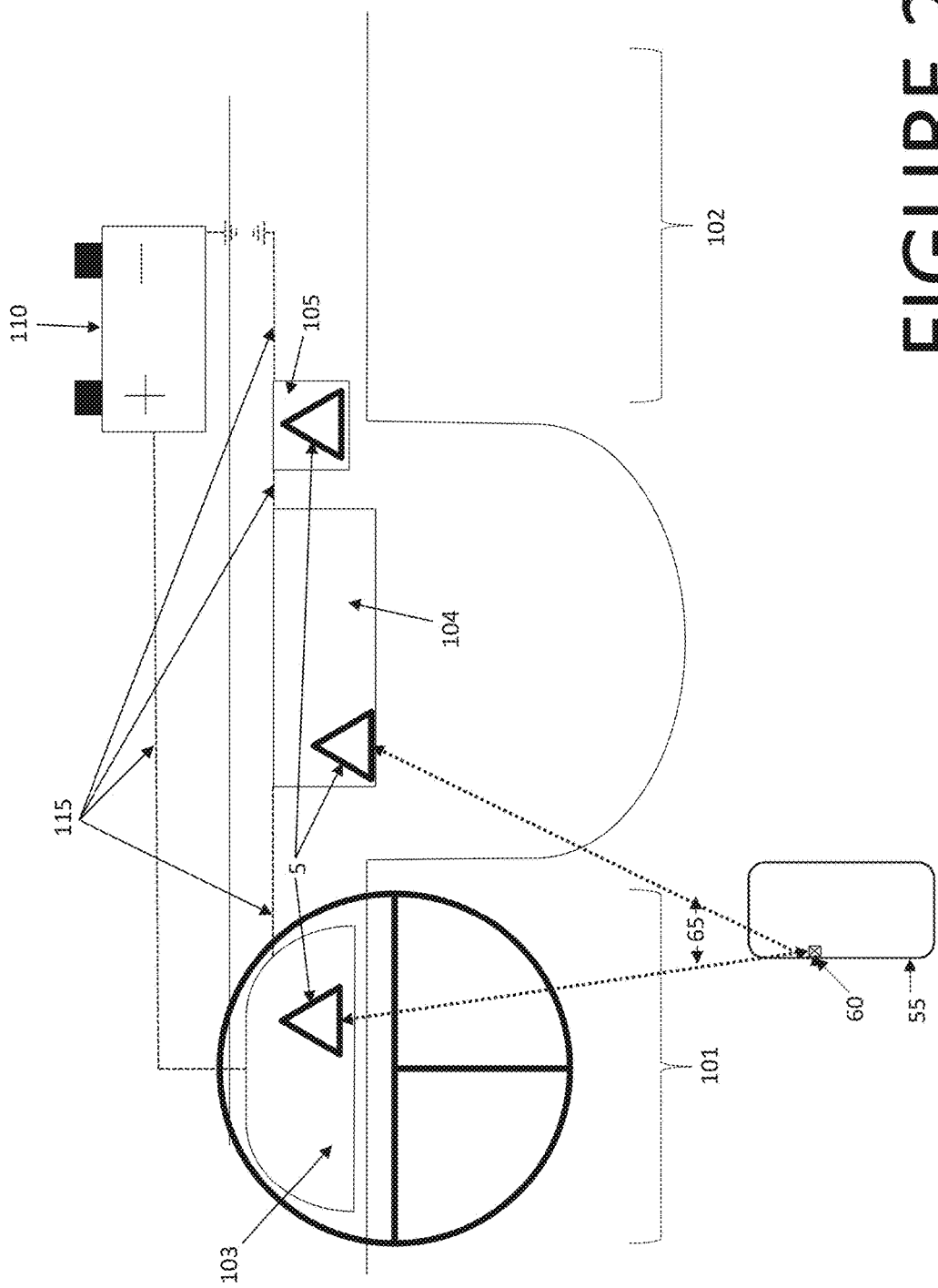
FIG. 2 is a view of illustrative placements of the device, which can be located on the vehicle's dashboard or the vehicle's electronic system or attached to any electrical circuitry in the vehicle.

As shown in FIG. 2, the device 5 is configured to be connected to any electrical circuitry in the vehicle (e.g., the wiring harness or secondary wires in a vehicle) that receives electricity directly or indirectly from vehicle battery 110, including the vehicle's dashboard (e.g., the dashboard behind the steering wheel or the dashboard between the passenger and the driver), the vehicle's electronic system (e.g., vehicle radio or music equipment, vehicle navigation equipment, vehicle heating and air conditioning system, or electronic controls), or any electrical circuitry in the vehicle. The wireless transmitter/receiver of device 5 communicates with a corresponding wireless receiver/transmitter 60 integrated within the mobile phone 55 of the user through short range wireless communication protocol 65. The vehicle's driver seat 101 and passenger seat 102 are illustrated in FIG. 2 for reference and perspective. The dashboard 103 behind the steering wheel, the electronic system 104 between the driver and passenger (i.e., where vehicle radio or music equipment, vehicle navigation equipment, vehicle heating and air conditioning system, or electronic controls typically are located) and other electrical circuitry 105 in the vehicle that is connected to the vehicle battery are illustrative placements of the device 5 in the vehicle, and not meant to represent all possible configurations. Device 5 is attached to the vehicle battery 110 and the vehicle electrical circuitry 115. The present invention includes any electrical circuitry in the vehicle, including electrical circuitry connected in series circuit or parallel circuit configurations.

In another embodiment of the invention, the device 5 may utilize an accelerometer to detect vibrations generated by various components of the vehicle when the vehicle is turned on. When a vehicle is turned on, many components of the vehicle vibrate as they receive electricity from the battery, and these vibrations can be detected by an accelerometer 80. Since the accelerometer 80 can be a component of the device 5 attached to electrical circuitry that is generally close to the larger working components of a vehicle, the accelerometer is in close proximity to many of the components of a vehicle that vibrate when they receive electricity. Thus, the device 5 is particularly well located in the vehicle to detect vibrations. By detecting these vibrations through the accelerometer 80, then the device 5 will determine when the vehicle is turned on through the vibrations caused by components of the vehicle receiving electricity. Similarly, the accelerometer 80 may be used to detect decreased vibrations of vehicle components to determine when the vehicle is turned off. Additionally, the accelerometer 80 could be used to measure if a vehicle is in motion.

In some embodiments, a combination of the microchip method described and the accelerometer method described are used to determine the vehicle state. The ability to use a combination of the microchip method described and the accelerometer method described to determine the vehicle state also has broader application outside of the present invention and other devices directed toward the problem of distracted driving, such as for dashboard cameras/video recorders on a vehicle's windshield, or any other electronic device for which it would be advantageous to determine when a vehicle is turned on and when a vehicle is turned off.

The device 5 registers the event of the vehicle turning on through the microchip 25 receiving electricity from the vehicle's battery and/or the accelerometer 80 detecting vibrations of the vehicle's components, and initiates a timer. The user must activate and connect the mobile phone software to the device 5 within a defined time frame after the vehicle is turned on. If the user does not connect the mobile phone software within that time frame, an audible alarm and/or visual alarm is generated and output through the speaker 35 and/or the visual alert 40, respectively. The audible alarm and/or visual alarm will continue either until the user activates the mobile phone software and connects to the device 5 or potentially until a defined time limit for the alarm is reached. This audible alarm and/or visual alarm when the vehicle turns on can be thought of as similar to the alarm process commonly generated in a vehicle when a user does not buckle his or her seat belt while driving. This audible alarm and/or visual alarm for a SBRS warning is generally understood within the vehicle market, and as such, the device 5 uses a well understood audible alarm and/or visual alarm mechanism to alert users of the need to connect the device 5 with the mobile phone software. If the defined time limit is reached, the device 5 can log that the user initiated a trip without connecting the mobile phone software and device 5 or that the user initiated a trip, but exited the mobile phone software. The device 5 may also log the total amount of time and number of times that an alarm has been active for a particular user or vehicle.

The device 5 is capable of generating an audible alarm and/or visual alarm when the user is not maintaining compliance with or is violating certain prescribed protocols, including the following non-limiting list of prescribed protocols:

(i) not connecting the device and the mobile phone software when the vehicle is turned on;

(ii) exiting the mobile phone software while driving;

(iii) stopping the connection between the mobile phone software and the device while driving;

(iv) putting the mobile phone software in the background of the mobile phone while driving; and/or (v) engaging in certain prohibited mobile phone functions while driving.

In certain embodiments, the mobile phone software is capable of generating an audible alarm and/or visual alarm when the user is not maintaining compliance with or is violating certain prescribed protocols as listed above.

The device is capable of counting the number of times a certain prescribed protocol violation occurs and/or the number of minutes for which the prescribed protocol violation occurs. Prescribed protocols associated with the audible alarm and/or visual alarm are intended to maintain compliance and keep the mobile phone executing the software to help limit or prevent distracted driving. Initially, when the vehicle is turned on, an audible alarm and/or visual alarm alerts the user to connect the device and the mobile phone software, similar to the alert from the SBRS warning when a driver does not buckle his or her seat belt after the vehicle is turned on. After this connection between the mobile phone software and the device is initially established, the user could attempt to circumvent compliance with the distracted driving solution by simply exiting the mobile phone software, thus potentially bypassing the software that is an essential component of the system, device and method intended to help prevent distracted driving. However, an audible alarm and/or visual alarm can be generated if the user exits the mobile phone software. The audible alarm and/or visual alarm would alert the user to return to the mobile phone software associated with the distracted driving solution. Similarly, the user could attempt to circumvent compliance with the distracted driving solution by simply putting the mobile phone software (e.g., mobile phone application) in the background of the mobile phone while driving. By putting the mobile phone software in the background of the mobile phone, the user could return to the main menu of the mobile phone interface or could gain access to other mobile phone applications (e.g., Facebook app or Snapchat app) or functions of the mobile phone (e.g., telephone calling, texting, or emailing) even though the mobile phone software is still running, thus potentially bypassing the mobile phone software that is intended to help prevent distracted driving. However, an audible alarm and/or visual alarm can be generated if the user puts the mobile phone software in the background of the mobile phone. The audible alarm and/or visual alarm would alert the user to return to the mobile phone software associated with the distracted driving solution. Alternatively, the user could attempt to circumvent compliance with the distracted driving solution by simply stopping the connection between the mobile phone software and the device while driving, and then performing actions not in compliance with the solution. By stopping the connection between the mobile phone software and the device while driving, the user could attempt to stop the short range wireless communication protocol 65, and thus potentially stop the audible alarm and/or visual alarm. After stopping the connection via the short range wireless protocol, the user could attempt to circumvent compliance with the solution, including by (i) exiting the mobile phone software while driving, or (ii) putting the mobile phone software in the background of the mobile phone while driving. However, because the audible alarm and/or visual alarm can be generated when the connection between the mobile phone software and the device is stopped, then the solution helps prevent the user from circumventing such compliance and potentially bypassing the software that is intended to help prevent distracted driving. In some embodiments, an audible alarm and/or visual alarm may be generated each time the user engages in certain behavior on the mobile phone while driving, such as telephone calling, texting, emailing, using certain prohibited applications on the mobile phone, and/or other infractions.

In some embodiments, the device will have a unique number associated with it. The mobile phone software may use this unique number to log which device the user connects with the user's mobile phone. The device will also log a unique identifier for the user's mobile phone to determine which mobile phones have connected with a particular device. Moreover, the device can also be limited to only accept the unique identifier for the mobile phone of the user. This functionality is intended to ensure that the mobile phone of the user is connecting with the appropriate device.

Once the mobile phone software and device have been connected, the mobile phone software may (i) monitor which mobile phone functions are performed by the user, and/or (ii) prevent the user from performing prohibited functions on the mobile phone. These monitored and/or prohibited functions may be selectively defined by an administrator or user and may include, for example, limiting or preventing telephone calls, texting, emailing, and/or any other specific functions or applications on the mobile phone. The administrator may select when to receive notifications about the user, such as if the user violates certain prescribed protocols, if the user engages in telephone calling, if the user engages in texting, if the user engages in emailing, if the user engages in the usage of certain prohibited applications on the mobile phone, if the user has certain infractions occur, if certain states of the device occur, and/or if the device has not connected within a defined time period (e.g., a day). An individual user's profile of monitored or prohibited functions may be selectively defined or include pre-defined profiles, such as no use, limited use with the telephone, or limited use without the telephone. The user profile is defined in the mobile phone software settings and will automatically apply those settings when the mobile phone software is activated and the mobile phone 55 is connected to the device 5.

In certain embodiments, the mobile phone software may include functionality to determine the speed of the mobile phone and monitor or prevent the user from performing the prohibited functions only when the speed exceeds a defined value, for example fifteen miles per hour. Vehicle speed may be determined using GPS technology of the mobile phone. This optional speed check feature allows the user to request that the mobile phone software determine whether the user is traveling under the defined speed threshold by having the user initiate a speed check through the mobile phone software interface. A user would initiate the speed check if the user would like to use the full functionality of the mobile phone when the vehicle is stopped, such as at a stoplight, stop sign, or waiting in a parking lot. The speed check can utilize the GPS technology embedded in the mobile phone. Such GPS technology and methods for monitoring the same are well known within the art. When the user initiates the speed check, then the GPS of the mobile phone will determine if the mobile phone is moving over the speed threshold. If the vehicle is under the speed threshold, then full functionality of the mobile phone will be allowed until the mobile phone reaches the speed threshold again (e.g., the user is initially stopped at a stoplight, the user initiates the speed check and is allowed to use the full functionality of the mobile phone as the mobile phone is under the speed threshold; the light then turns green, and the user begins to drive; once the mobile phone reaches the speed threshold, then the mobile phone functionality will be limited again). Engaging GPS technology on a mobile phone causes significant battery drain of the mobile phone. Thus, a significant advantage of only using the mobile phone's GPS for limited amounts of time during the trip is that the mobile phone software will not constantly use the mobile phone's GPS technology, thereby minimizing the drain on the mobile phone's battery. Alternatively, speed may be determined using GPS technology that is available in the vehicle, thus not using the mobile phone's battery.

In certain embodiments, the mobile phone software may include functionality to determine when the mobile phone is in motion and to monitor or prevent the user from performing the prohibited functions only when the mobile phone is in motion. This mobile phone sensor technology may determine motion of the mobile phone by using the mobile phone's accelerometer, the mobile phone's gyroscope, and/or the mobile phone's magnetometer. In certain embodiments, this optional mobile phone sensor technology feature allows the user to request, through the mobile phone software interface, that the mobile phone sensor technology determine whether the mobile phone is in motion. Functions in several operating systems include the ability to have a mobile phone application or mobile phone operating system utilize data from the mobile phone's accelerometer, the mobile phone's gyroscope, and/or the mobile phone's magnetometer. By using this data, the mobile phone software can determine if the mobile phone is in motion. A user could be provided full functionality of the mobile phone when the vehicle is not in motion, such as at a stoplight, stop sign, or waiting in a parking lot. This optional feature would utilize the sensor technology embedded in the mobile phone. Such sensor technology and methods for monitoring the same are well known within the art. The sensors on the mobile phone will determine if the mobile phone is in motion. If the vehicle is not in motion, then full functionality of the mobile phone will be allowed until the mobile phone is in motion again (e.g., the user stops at a stoplight, the sensor technology determines the mobile phone is not in motion, full functionality of the mobile phone is provided as the mobile phone is not moving; the light then turns green, and the user begins to drive; once the mobile phone is moving again, then the mobile phone functionality will be limited again). Alternatively, motion may be determined using accelerometer technology that is available in the vehicle, thus not using the mobile phone's battery.

Figure 9:
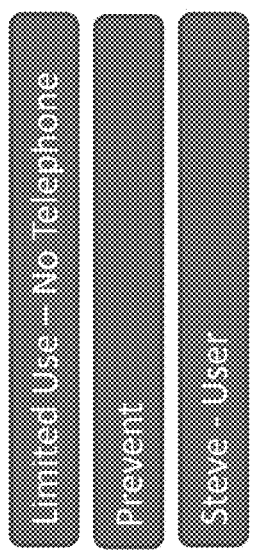
FIG. 9 is a graphical illustration of a computer screen showing the user records of the mobile phone software as seen by an administrator or user for a 7 day or 1 week period, wherein with the user's mobile phone software is configured to prevent mobile phone usage. The computer screen may be on different types of devices such as mobile phones, tablets, and personal computers.

When the mobile phone software is connected with the device, the mobile phone software will also monitor or prevent the mobile phone for such functionality as telephone calling, texting, emailing, using certain prohibited applications on the mobile phone, and/or other infractions, and will store such information on the mobile phone software and/or transmit the data to the device. In some embodiments, certain mobile phone operating systems will allow a user or administrator to both i) monitor mobile phone usage, and/or ii) prevent mobile phone usage. FIG. 6 is a graphical illustration of a computer screen showing the user records of the mobile phone software as seen by an administrator or user for a 7 day or 1 week period with the user's mobile phone software configured to monitor mobile phone usage. If monitoring of mobile phone usage is utilized, the user's usage of the mobile phone software is monitored when the user is engaging in telephone calling, texting, emailing, using certain prohibited applications on the mobile phone, and/or infractions on the mobile phone. FIG. 9 is a graphical illustration of a computer screen showing the user records of the mobile phone software as seen by an administrator or user for a 7 day or 1 week period with the user's mobile phone software configured to prevent mobile phone usage. When the user's mobile phone software is configured to prevent mobile phone usage, then the mobile phone software can prevent the user from engaging in telephone calling, texting, emailing, and/or using certain prohibited applications on the mobile phone. Certain mobile phone operating systems may allow a user or administrator only to monitor mobile phone usage, but not to prevent mobile phone usage; in addition, monitoring on such operating systems may be more limited. If a user exits the mobile phone software process while driving (i.e., while the device is in the "connected" state, as further described below), then the device may create an audible alarm and/or visual alarm to alert the user to return to the mobile phone software, as previously discussed. In some embodiments, if either the monitor mobile phone usage, or prevent mobile phone usage functionality of the mobile phone software is utilized, then the mobile phone software will also monitor for other infractions. User profile options in the mobile phone software settings regarding i) potential features available to limit or prevent mobile phone functionality that an administrator or user can choose from, and ii) potential pre-defined profiles available to limit or prevent mobile phone functionality are further described below. In certain embodiments, depending on the operating system of the mobile phone, the user and/or administrator will be able to either a) both monitor mobile phone usage and prevent mobile phone usage, or b) only monitor mobile phone usage, which could affect the i) potential features available to limit or prevent mobile phone functionality that an administrator or user can choose from, and ii) potential pre-defined profiles available to limit or prevent mobile phone functionality.

In certain embodiments, the user profile settings of the mobile phone software allow the administrator and/or user to select which mobile phone features are available to a user (i.e., features that are not prohibited) when the device and the mobile phone software are connected. FIG. 4 provides a high level overview of potential features that are available to be selected by the administrator and/or user. The ability to select features allows the administrator or user to determine which mobile phone functions will be monitored or prevented and which mobile phone functions will be allowed when the mobile phone software of the user is connected to the device. The administrator or user can determine if the speed check feature and/or mobile phone sensor technology is available, if the user can engage in telephone usage, and which applications are allowed to be used. However, these functions will be available when the mobile phone software is not connected to the device or if the mobile phone is determined to be below the speed threshold through the user initiated speed check, if the speed check feature has been made available by the user and/or administrator. Alternatively, if the mobile phone sensor technology feature has been made available by the user and/or administrator, these functions will be available when the mobile phone is not in motion as determined by the mobile phone sensor technology.

Figure 5:
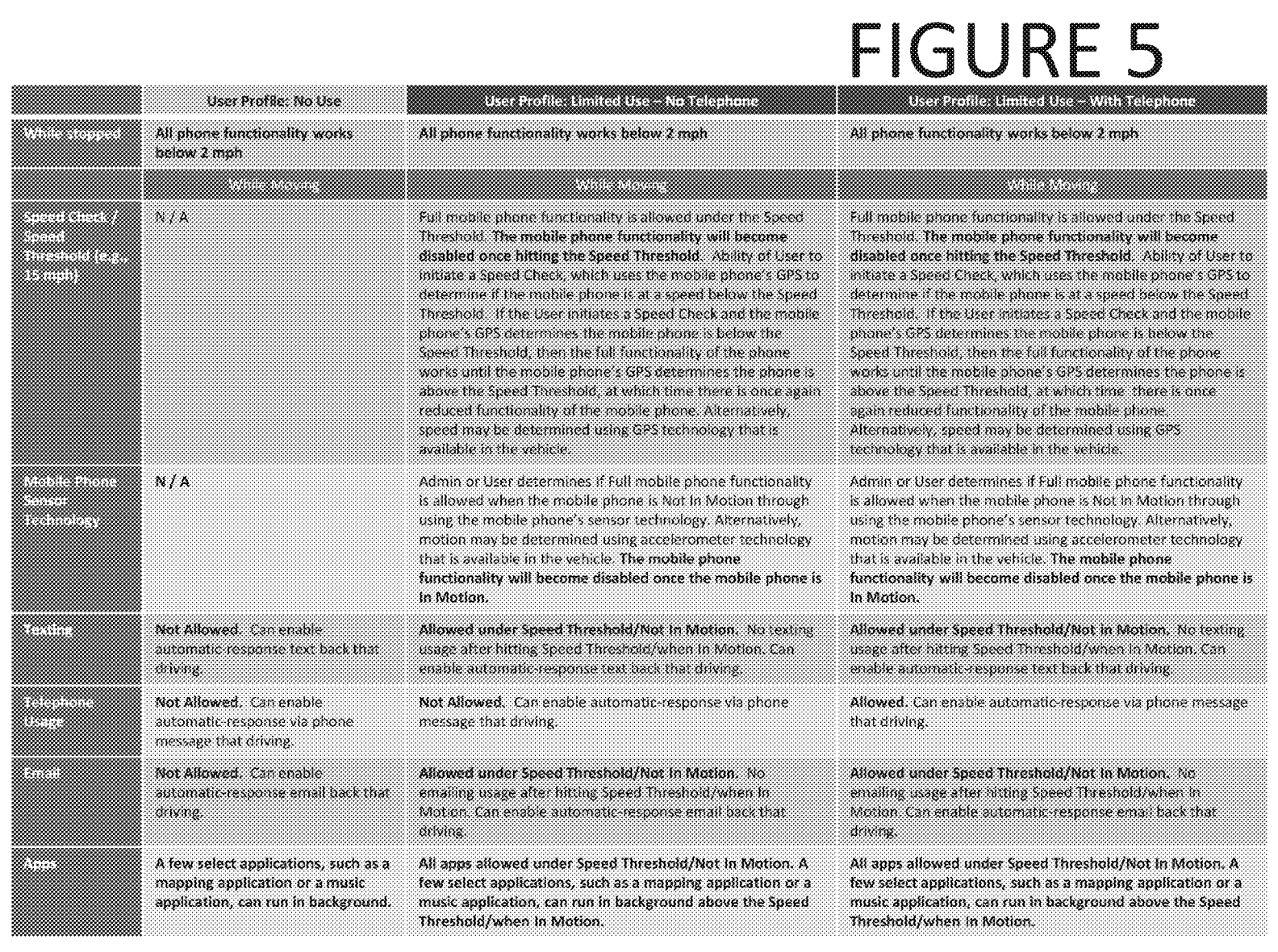

In another embodiment, the administrator and/or user will only be able to select from pre-defined profiles available for the user's profile in the settings on the mobile phone software. An individual user's pre-defined profile of prohibited functions may include, for example, i) no use of any mobile phone functions while the device and the mobile phone software are connected, ii) limited use of mobile phone functions and no use of telephone calling while the device and the mobile phone software are connected, or iii) limited use of mobile phone functions and with use of the telephone calling while the device and the mobile phone software are connected. FIG. 5 provides a high level overview of potential pre-defined profiles available for a user's profile. The pre-defined profiles are provided in order to reduce confusion experienced by a user or administrator when setting up a user profile. Additionally, the pre-defined profiles improve comparability of scoring between users when these users join groups or have a network of friends as further described herein. When the pre-defined profile for no use of any mobile phone functions is selected, then the mobile phone software will monitor or prevent all functions on the mobile phone, including texting, emailing, voice calling (except 911), and/or using most applications on the mobile phone, except a limited number of pre-defined user necessary applications, such as mapping applications or music applications. However, these functions will be available when the device and the mobile phone software are not connected or if the mobile phone is determined to be below the speed threshold through the user-initiated speed check, if the speed check feature has been made available by the user and/or administrator. Alternatively, if the mobile phone sensor technology feature has been made available by the user and/or administrator, these functions will be available when the mobile phone is not in motion as determined by the mobile phone sensor technology. When the pre-defined profile for limited use of mobile phone functions and no use of the telephone for a voice call while driving is selected, then the user can use pre-defined applications, such as mapping and applications for music. The user will be monitored or prevented from texting, emailing, using certain prohibited applications, and/or making or receiving voice calls in this mode. However, these functions will be available when the device and the mobile phone software are not connected or if the mobile phone is determined to be below the speed threshold through the user-initiated speed check, if the speed check feature has been made available by the user and/or administrator. Alternatively, if the mobile phone sensor technology feature has been made available by the user and/or administrator, these functions will be available when the mobile phone is not in motion as determined by the mobile phone sensor technology. When the pre-defined profile for limited use of mobile phone functions and allowed use of the telephone for voice calling while driving is selected, then the user can use pre-defined applications, such as mapping and applications for music. The user will be monitored or prevented from texting, emailing, and/or using certain prohibited applications, but can make and receive voice calls in this mode. However, these functions will be available when the device and the mobile phone software are not connected or if the mobile phone is determined to be below the speed threshold through the user-initiated speed check, if the speed check feature has been made available by the user and/or administrator. Alternatively, if the mobile phone sensor technology feature has been made available by the user and/or administrator, these functions will be available when the mobile phone is not in motion as determined by the mobile phone sensor technology.

In some embodiments, automatic answering can be enabled for incoming telephone calls, emails, and/or text messages to the mobile phone. For example, incoming telephone calls may be answered with a message that the user of the mobile phone is currently driving and will respond to the telephone call when he or she is available. The caller may choose to leave a voice message. Similarly, an incoming email may be answered with an automatic return email that the user is driving and will respond when he or she is available. Likewise, an incoming text message may be answered with an automatic return text message that the user is driving and will respond when he or she is available.

In certain embodiments, the mobile phone software will have two types of entitlements, i) administrators, and ii) users. The following examples of administrator entitlements are meant to provide some examples of administrator abilities, and are not an exhaustive list. As previously discussed, the administrator may, through the user's profile in the settings for the mobile phone software, control which functions of the mobile phone are monitored or prevented when the device and mobile phone software are connected. The administrator may be able to choose, in the user profile settings of the mobile phone software, which potential features and mobile phone functions are monitored or prevented when the mobile phone software and device are connected, as shown in FIG. 4. The administrator may be able to choose in the settings which pre-defined profiles are applied to the user's profile when the mobile phone software and device are connected, as shown in FIG. 5. In addition, the administrator may disable the "off" state functionality, as defined below, of the device. The reason for this is that the "off" state functionality is intended as the device's state when a user does not carry a mobile phone while driving, but a user could attempt to circumvent compliance by putting the device in the "off" state when in the fact the user is carrying a mobile phone while driving. Therefore, an administrator may want to prevent such behavior. Upon review of the device's stored information, an administrator reasonably familiar with the user's expected driving patterns could possibly detect such behavior. The administrator may monitor the amount of time for which prescribed protocols are violated. The administrator may select when to receive notifications about the user, such as if the user violates certain prescribed protocols, if the user engages in telephone calling, if the user engages in texting, if the user engages in emailing, if the user engages in using certain prohibited applications on the mobile phone, if the user has certain infractions occur, if certain states of the device occur, and/or if the device has not connected within a defined time period (e.g., a day).

After the user's completion of a vehicle trip, the device 5, through one or more of the vehicle state sensors, determines when the vehicle is turned off, and the device and/or mobile phone software registers a completed trip. The device can register when the vehicle is turned off and the completion of the trip through the microchip method described above or the accelerometer method described above. In certain embodiments, after completion of a trip, the connection between the device 5 and the mobile phone 55 will terminate and the device 5 will transmit data to the mobile phone 55.

In some embodiments, the device can register completion of a trip through a combination of one or more of (i) the microchip method described above, and/or (ii) the accelerometer method described above. Additionally, the device may have a setting in which a user can select to hear an audible alarm and/or visual alarm, or receive an alert via the mobile phone, at the completion of a trip to serve as a reminder for other purposes. This feature has many useful applications, for example, alerting the user could remind him or her that a baby is in the back of the vehicle, particularly during hot summer months. Or, for example, the alarm could be useful in vehicles that use a keyless fob, which does not require a physical key to be inserted into the vehicle ignition switch, for alerting the user that the trip is complete so that the engine does not continue to run and emit carbon monoxide, particularly in the garage of a house, after the user exits the vehicle.

Figure 3:
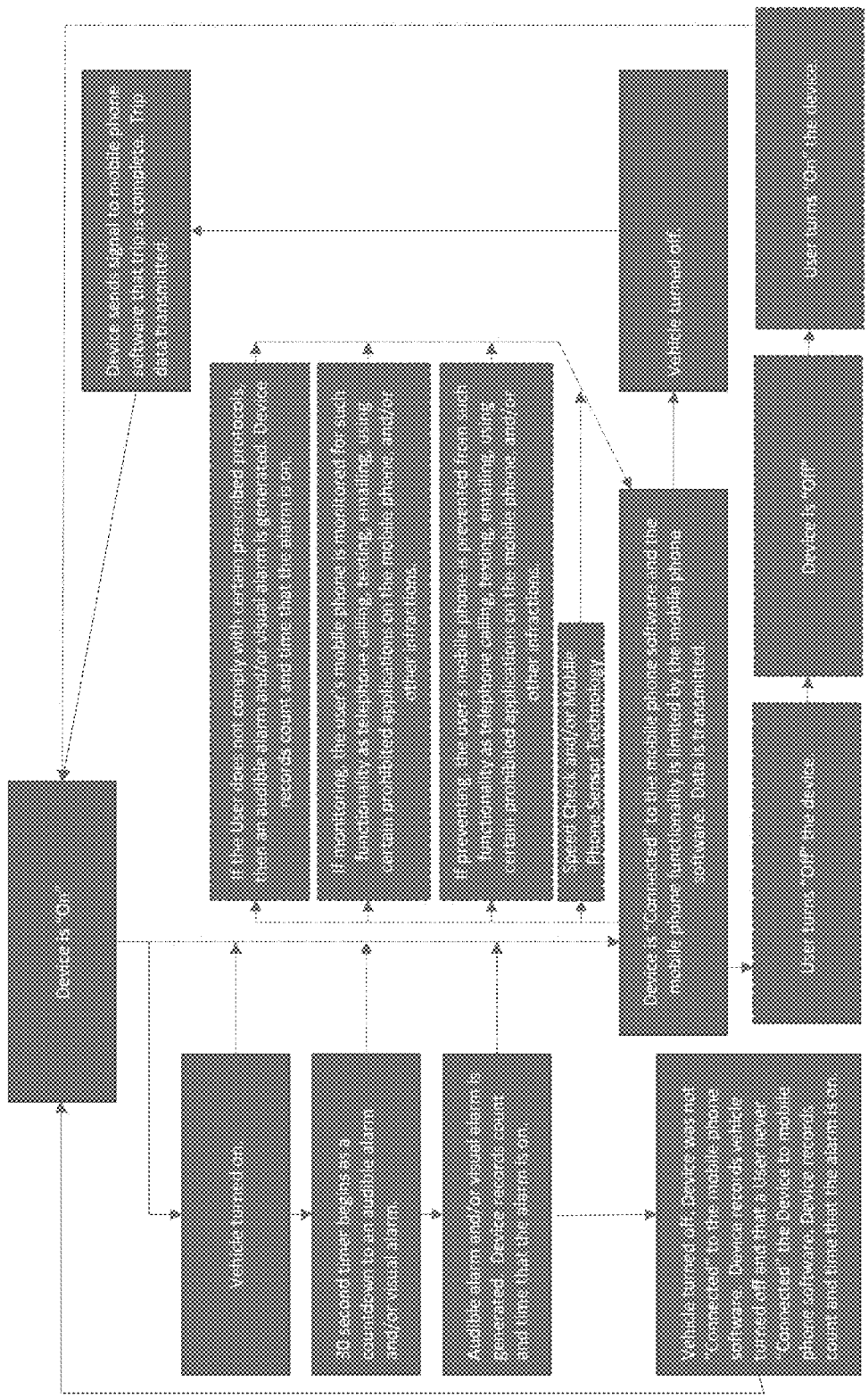
FIG. 3 is a flow chart illustrating the determination of the state of the device, generating of an audible alarm and/or visual alarm in response to violation of prescribed protocols, and the operation of the status indicator light. The flow chart is an exemplifying, non-limiting determination of the state of the device and the corresponding operation of the status indicator light.

The status indicator light 30 on the device 5 can indicate a plurality of device states. A flow chart illustrating an exemplifying, non-limiting determination of the device state and the corresponding operation of the status indicator light is shown in FIG. 3. The status indicator light may indicate an "on" state, e.g., by illuminating as a green light. The "on" state indicates that the device is ready to (i) track, monitor, or prevent mobile phone usage while a user is operating a vehicle in order to deter and prevent such usage, and (ii) generate an audible alarm and/or visual alarm to maintain compliance with certain prescribed protocols. The device will track the total time, e.g., in minutes, which the device remains in an "on" state, storing this information in the device. Such tracking is important to track compliance with the system.

The status indicator light 30 may indicate a "connected" state, e.g., by illuminating as a green light. In certain embodiments, the status indicator light will turn off after a certain period of time to reduce power use. The "connected" state is initiated when the mobile phone software is connected to the device. In order to enter a "connected" state, the device must first be in an "on" state. When the "connected" state occurs, the device and the mobile phone software are connected, and the mobile phone software is used to monitor, control, and/or prevent usage of certain features of the mobile phone while the user is driving. The device remains in the "connected" state any time while the user has connected the mobile phone software to the device when driving. The device will track the total time, e.g., in minutes, which the mobile phone software and device remain in a "connected" state and count the number of times that the device and mobile phone software connect, storing this information in the device. To receive credit for the total time in a "connected" state and the number of times that the device and mobile phone software connect, it may be necessary for the vehicle to be on for a minimum amount of time, such as 2 minutes. In certain embodiments, the device may store which users connected a mobile phone to the device and may only allow certain users to connect to that device. Additionally, there could be a preferred order for which user's mobile phone will connect to the device when there are multiple users' mobile phones associated with a device within distance to connect via short range wireless communication protocol 65.

The status indicator light 30 may also indicate an "off" state for the device, e.g., by illuminating as a yellow light. In the "off" state, the device 5 will not (i) track, monitor, or prevent mobile phone usage while a user is operating a vehicle in order to deter and prevent such usage, and (ii) generate an audible alarm and/or visual alarm to maintain compliance with certain prescribed protocols. The "off" state is activated when the device has been turned off through the user interface of the mobile phone software by the user. The "off" state may be requested by the user, and is used when the user is driving without a mobile phone. A user can toggle between the "on" state and "off" state by using the mobile phone software when the mobile phone software and device are connected via the short range wireless communication protocol 65.

The device automatically logs the number of times the device is in each state and the total amount of time the device is in each state. As such, the device will track the total time that the device remains in each state and count the number of times that the device remains in each state, storing this information in the device. Thus, the device can account for the device state at all times. The device can also record the amount of time in which the audible alarm and/or visual alarm on the device is generated and which prescribed protocols were violated. The mobile phone software can record the amount of time that certain functions of the mobile phone are being used, such as time spent on telephone calling, texting, emailing, using certain prohibited applications on the mobile phone, and/or other infractions. Every time the device connects to the mobile phone software or completes a trip, the data for the time the device has spent in each state and the count of times the device was in each state as well as the data for the time the device has spent with the audible alarm and/or visual alarm on and the count of times the device had the audible alarm and/or visual alarm on are transmitted to the mobile phone software, which then transmits the data to a remote storage database. Thus, in certain embodiments, a user or the administrator may be able to receive information on a user's recent trip soon after the trip is completed. However, after a trip is completed and prior to the next trip, if the device is in an "on" state or "off" state, then the data stored during this period in the device will be transferred to the mobile phone software the next time that the device connects to the mobile phone software; this is generally necessary as the mobile phone software and device must connect to transfer the data. The "on" and "connected" states are generally associated with a positive behavior (i.e., the user is complying with the expected behaviors in using the device). The "off" state is used to disable generating an audible alarm and/or visual alarm when the user is not complying with certain prescribed protocols, but this functionality may be disabled by an administrator, as it could lead to circumventing compliance as described above. Users and administrators can then access and view data associated with the device through the mobile phone software interface as illustrated in FIG. 10. The device data is specific to a device in a certain vehicle, and could include multiple users utilizing the same vehicle.

Users and administrators can then access and view data associated with their mobile phone through the mobile phone software interface or mobile phone operating system interface as illustrated in FIGS. 6, 7, 8, and 9. FIGS. 6, 7, 8, and 9 are graphical illustrations of a computer screen showing the user records of the mobile phone software as seen by an administrator or user; FIG. 10 is a graphical illustrations of a computer screen showing the device records as seen by an administrator or user. FIGS. 6, 7, and 9 illustrate the ability to track and monitor mobile phone usage based on different views of durations of time. FIGS. 6 and 7 illustrate the ability to monitor compliance with prescribed protocols, telephone calling, texting, emailing, using certain prohibited applications on the mobile phone, and/or other infractions.

FIG. 8 is an illustration of the mobile phone software interface showing data for a group of users that is utilizing the device and mobile phone software. The viewable records provide transparency and monitoring capabilities for each user's mobile phone usage while driving. Certain views may be only available to administrators. A group could help its members track their own compliance and apply social or peer pressure for other members not to engage in distracted driving. In certain embodiments, users may invite other users as a friend, and the friend will be able to see the scoring and have transparency into the user's behaviors. Similarly, the user may have transparency into the scoring of the friends in his or her network. The scoring system encourages social pressure and individual monitoring to improve user behavior. The mobile phone software allows users to join groups or connect with friends to improve on their driving behaviors together. Users may also join challenges or campaigns in which users may compete to achieve a certain goal or goals during a defined time period. Through the tracking functionality, full transparency is provided into the user's behaviors regarding their compliance with the distracted driving solution, and then out to members of groups or networks of friends, and potentially the broader public. By having full transparency, other users that interact with a certain user may decide to attempt to alter the behavior of the user. For example, a father may decide to limit his son's use of the vehicle if the son continues to engage in distracted driving or a group of parents that carpool together may not invite another parent to be in the carpool if he or she continues to engage in distracted driving. The groups and friends allow significant benefits of providing incentives and social pressure to help reduce distracted driving. The scoring also provides positive reinforcement to the user for his or her improvement, similarly to other mobile phone applications synced with performance devices, such as fitness applications.

In certain embodiments, the device scoring system illustrated in FIG. 10 utilizes the data from the device indicating the number of times the device is in each state, the total amount of time the device is in each state, the number of times the device has the audible alarm and/or visual alarm on, and the total amount of time the device has the audible alarm and/or visual alarm on. As such, the device scoring system utilizes the device's tracking of the total amount time that the device remains in each state, counts of the number of times that the device is in each state, the total amount of time that the audible alarm and/or visual alarm are on, and counts of the times the audible alarm and/or visual alarm are on, while storing this information in the device. The device data is specific to a certain vehicle, and could include multiple users utilizing the same vehicle. The device scoring system is meant to monitor compliance when there is no user's mobile phone (thus, when not in a "connected" state) connected via short range wireless communication protocol 65 to the device. Device scores are positively rewarded for connecting the device and mobile phone software to monitor or prevent mobile phone functionality when the vehicle turns on and leaving the device in an "on" state. Device scores are neither rewarded nor penalized when the device is in the "off" state. "Alarm #/Mins" can measure the number of times the alarm was generated and the time that the alarm was on, which for the device scoring system is when a user does not connect the mobile phone software to the device after the vehicle is turned on. The device scoring system illustrated in FIG. 10 shows the total time that the device is "on" in an illustrative example. For example, a device that is "on" for 24 hours a day will go 1,440 minutes a day (60 minutes×24 hours) with the device "on." If the device is "off", then this data will be stored in the device and eventually transmitted to the mobile phone software. The total minutes in a given day is 1,440 minutes, which will be recorded in the "on" and "off" states. The "connected" state is the total time during which the mobile phone software and device are connected and overlaps with the "on" state. The "connected" state is not included in the device scoring, but can be tracked by the device. If the device remains in the "on" state and users connect the mobile phone software to the device every time that the vehicle is driven, then 100 points a day will be received for the device score. By using 100 points a day for such a behavior, the device score is rewarded for always complying with the distracted driving solution throughout the day.

In certain embodiments, an app scoring system for an individual user takes into account the user's behaviors with his or her mobile phone while driving, such as complying with prescribed protocols, telephone calling, texting, emailing, using certain prohibited applications on the mobile phone, and/or other infractions. The app scoring data is meant to monitor compliance for an individual user when the user's mobile phone (thus, when in a "connected" state) is connected via short range wireless communication protocol 65 to the device. "Alarm #/Mins" can measure the number of times the alarm was generated for violating prescribed protocols and the time that the alarm was on when the mobile phone software and device are "connected." Similarly, "Telephone Call #/Mins" can measure the number of telephone calls and the time of telephone usage (telephone usage can be monitored or prevented based on the user's profiles) when the mobile phone software and device are "connected." "Text #" can measure the number of texts (texts can be monitored or prevented based on the user's profiles) when the mobile phone software and device are "connected." "Email #/Mins" can measure the number of emails and the time spent in the email application (emails can be monitored or prevented depending based the user's profiles) when the mobile phone software and device are "connected." "Prohibited Apps #/Mins" can measure the number of prohibited applications utilized on the mobile phone, the number of times such applications are utilized, and the time that the users spent in these prohibited applications on the mobile phone (prohibited applications can be monitored or prevented depending based the user's profiles) when the mobile phone software and device are "connected." "Other Infractions" can measure certain other usage of the mobile phone when the mobile phone software and device are "connected." For example, a user may set a goal to limit mobile phone usage to less than 25% of the time while driving. By monitoring the amount of time the user is engaging in voice telephone calling while connected during an individual trip, the mobile phone software and device can determine if the other infraction has occurred. Of course, the user may choose to leave the mobile phone software alone while driving and not interact with the mobile phone, thus remaining in the system's mobile phone software during the entire trip. The "connected" state is the total time when the mobile phone software and device are connected and overlaps with the "on" state. The alarm, telephone calling, texting, emailing, using certain prohibited applications on the mobile phone, and/or other infractions can also be monitored, with appropriate scoring deductions applied for engaging in such behavior. If a user does not violate prescribed protocols, does not use the telephone, does not text, does not email, does not use any prohibited applications, and does not have any other infractions, then the user will receive 100 points a day. By using 100 points a day for such a behavior, a user is neither rewarded nor penalized for the total number of trips completed in a given day, but instead the user is rewarded for always complying with the distracted driving solution throughout the day.

The device and app scoring system can provide a consistent metric with views available over periods of time, such as ranging from a day to a year. The device and app scoring system can create a uniform mechanism to compare users. The app scoring mechanism can also help users to set goals, such as reducing telephone usage while driving (assuming this feature has been available to the user), in order to reduce overall distracted driving. Setting goals (and receiving feedback on how well an individual is performing against such goals) is often used in self-help devices, such as fitness devices and CPAP (continuous positive airway pressure) devices. Mobile phone applications are increasingly used to track and share with others an individual's performance on a device. Scoring mechanisms reward users for engaging in safe positive behaviors while penalizing negative behaviors. With the scoring, views are provided of different periods of time. For example, views are available to see the results over a day, a week, a month, a 6 month period, or a year. The user and the administrator can see views of every different period of time to see progress over periods or to analyze certain trends in behavior.

It will therefore be readily understood by those persons skilled in the art that the present invention is susceptible to broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to its preferred embodiments, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications, and equivalent arrangements.

What is claimed is:

1. A system for monitoring or preventing use of one or more of a plurality of functions of a mobile phone of a user when the user is in a vehicle, comprising:

a device comprising one or more vehicle state sensors, a wireless transmitter and a microchip configured to receive and store data, wherein the one or more vehicle state sensors sense a condition indicative of the vehicle being in an on state based on the device receiving electricity from a battery of the vehicle; and the mobile phone of the user, comprising a wireless receiver and driver monitoring software, and wherein:

the device determines whether the vehicle is in the on state based on input from the one or more vehicle state sensors;

the mobile phone generates an alarm when the device determines that the vehicle is in the on state based on the condition sensed by the vehicle state sensors, in conjunction with one of at least two separate alarm conditions detected by the driver monitoring software;

the at least two alarm conditions comprise a first condition and a second condition;

the first alarm condition occurs when the driver monitoring software determines that the mobile phone is not in wireless communication with the device based on the driver monitoring software determining that a communication protocol link between the mobile phone and the device is not established;

the second alarm condition occurs when the driver monitoring software detects that the driver monitoring software on the mobile device is not running; and the driver monitoring software monitors or prevents use of one or more of the plurality of functions.

2. The system of claim 1, wherein the driver monitoring software detects that the driver monitoring software on the mobile device is not running based on the user exiting the driver monitoring software.

3. The system of claim 1, wherein the device is operationally engaged with electrical circuitry in the vehicle that receives electricity directly or indirectly from the battery of the vehicle.

4. The system of claim 1, wherein a communication indicating a prohibited function of the mobile phone is viewable by an administrator.

5. The system of claim 1, wherein:

the mobile phone further comprises a GPS sensor; and wherein the driver monitoring software determines whether the user is traveling under a defined speed threshold based on data received from the GPS sensor, and wherein the driver monitoring software enables use of a prohibited function based on determining the user is traveling under the defined speed threshold.

6. The system of claim 1, wherein:

the mobile phone further comprises a motion sensor to generate mobile phone motion data; and wherein the driver monitoring software enables use of the prohibited function based on determining the motion data indicates the mobile phone is not in motion.

7. The system of claim 1, wherein:

the device further comprises a unique number for identifying the device;

the mobile phone further comprises a unique identifier for identifying the mobile phone;

the wireless transmitter of the device communicates the unique number of the device to the mobile phone via the receiver, and the driver monitoring software uses the unique number and the unique identifier to determine whether the user is a driver of the vehicle.

8. The system of claim 1, wherein the driver monitoring software determines that mobile phone is not in wireless communication with the device based on the user exiting the driver monitoring software.

9. The system of claim 1, wherein the driver monitoring software determines that mobile phone is not in wireless communication with the device based on the user stopping the connection between the driver monitoring software and the device.

10. The system of claim 1, wherein the mobile phone determines the driver monitoring software is not running based on the user putting the driver monitoring software in the background of the mobile phone.

11. The system of claim 1, wherein the mobile phone generates an alarm when the device determines that the vehicle is in the on state based on the condition sensed by the vehicle state sensors, in conjunction with a third alarm condition detected by the driver monitoring software, and wherein the third alarm condition occurs when the mobile phone receives data from the driver monitoring software indicating a prohibited function of the mobile phone while the user is driving.

12. The system of claim 1, wherein the prohibited function is one or more of: texting, emailing, voice calling, and using an application.

* * * * *